TAPE TRANSPORT

Filed June 19, 1969 3 Sheets-Sheet 1

Cecil R. Gilbreath
Henry T. Ray
INVENTORS

BY Michael P. Breston
ATTORNEY

Sept. 20, 1971 C. R. GILBREATH ET AL 3,606,198

TAPE TRANSPORT

Filed June 19, 1969 3 Sheets-Sheet 2

Cecil R. Gilbreath
Henry T. Ray
INVENTORS

BY Michael P. Breston
ATTORNEY

Cecil R. Gilbreath
Henry T. Ray
INVENTORS

BY Michael P. Breston
ATTORNEY 3,606,198
TAPE TRANSPORT
Cecil R. Gilbreath and Henry T. Ray, Houston, Tex., assignors to Geo Space Corporation
Filed June 19, 1969, Ser. No. 834,736
Int. Cl. B65h *59/38;* G11b *15/52, 15/54*
U.S. Cl. 242—186 8 Claims

ABSTRACT OF THE DISCLOSURE

This invention is concerned with magnetic tape transports which include a supply reel and a takeup reel for moving magnetic recording tape about a magnetic read-write head. Each reel preferably has a drive motor. A transducer senses linear tape speed errors by producing a signal having a parameter which is proportional to the instantaneous speed of the tape. This signal is converted for comparison with a standard signal and the output of the comparator network is used to control the speed of the driving motor.

BACKGROUND OF THE INVENTION

The reel-type magnetic tape transport finds increasing application in the processing of seismic signals. The present day tape transports used in seismic tape recorders are relatively bulky, expensive, wasteful of electric energy and employ a single or dual capstan system for engaging the magnetic recording tape and moving it about the reel. The capstan drive system depends on frictional engagement between the magnetic tape and the capstan which results in undesirable noise.

It will be appreciated that in capstan drive systems it is desirable during the recording process to keep the tension of the tape on the capstan at a constant value. Since magnetic recording tape is elastic, variations in tension will produce variations in the lengths of the recording traces. Moreover, it is difficult to maintain the conditions of temperature, humidity, tape tension and coefficients of friction at the time of recording and playback substantially the same. These problems become compounded when the tape is played back on a different machine which invariably contains small variations in capstan dimensions and other significant differences. Also, either during recording or playback such things as sticky finger prints on the tape or on some other guiding surface may result in sudden variations in the tape tension.

Hence, in capstan drive systems the basic consideration during the recording process is to maintain the tape tension about the capstan substantially constant. Another consideration is to achieve very fast tape acceleration. Attempted solutions to these problems involved the use of relatively heavy-mass capstans machined to very close tolerances.

SUMMARY OF THE INVENTION

In accordance with the present invention the speed of the tape is continuously monitored to obtain an electrical signal having a parameter which is directly proportional to the speed of the tape. This electrical signal is then compared with a standard signal. From the comparison results a control signal which controls the speed of at least one drive motor driving the tape reel.

In one preferred embodiment a tachometer is employed to produce a signal having a frequency which is at each instant of time proportional to the speed of the tape at that instant. This signal is first amplified and limited, differentiated, detected, integrated and then compared with a ramp signal. The output of the comparator is a pulse wave having pulsewidth modulations corresponding to the tape speed deviations from a pre-set speed value. The pulsewidth modulated wave is applied to a switch in the energizing circuit of the motor which drives the tape reel.

In accordance with this invention the need for relatively expensive and noise-generating capstans is eliminated. A tape transport is provided which is especially suitable for seismic recording apparatus, which is well adapted to work both in the field as well as in a playback office, which employs relatively inexpensive and standard components, and which can be manufactured at a fraction of the cost of the recorders now employed in the seismic industry.

The foregoing and other features of the present invention will be better understood from the following detailed description taken in connection with the accompanying drawings.

Figure 1:
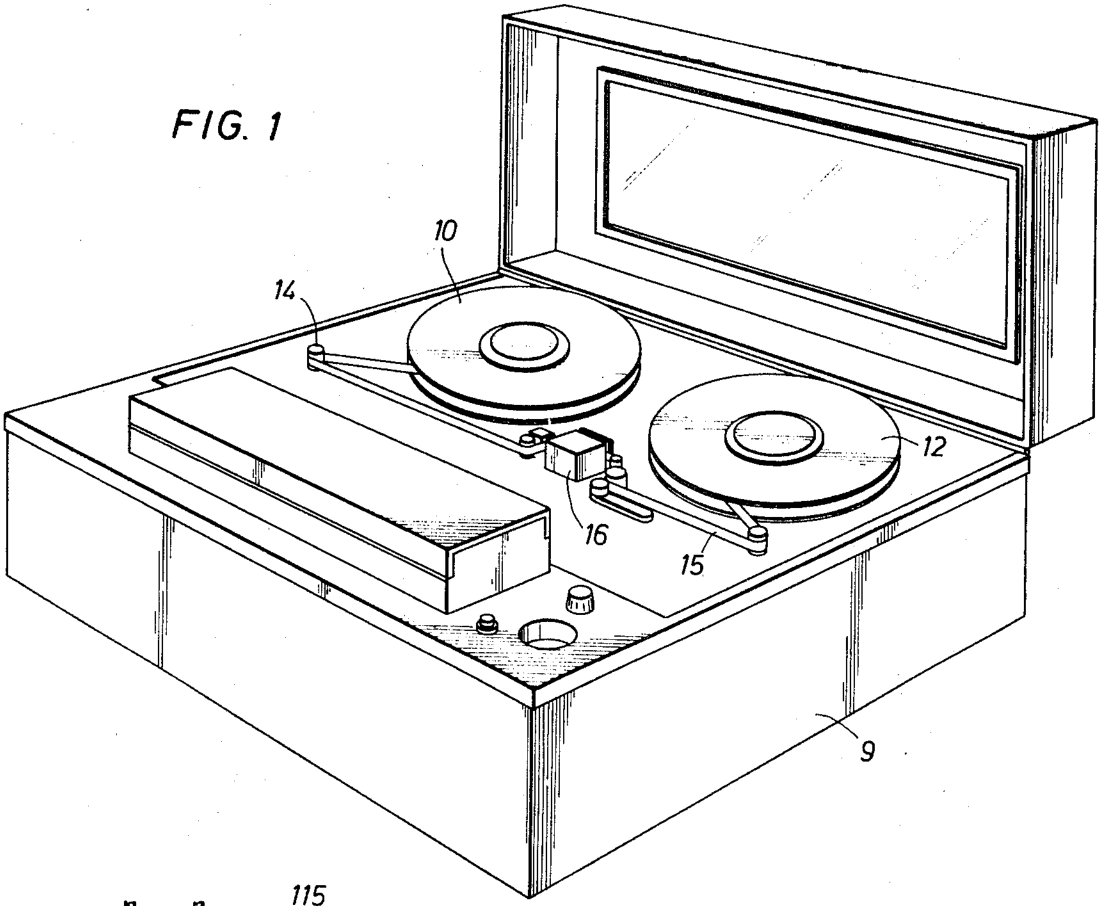
FIG. 1 is an isometric view of the housing for the magnetic tape transport embodying the tape speed control system of the present invention.
Figure 2:
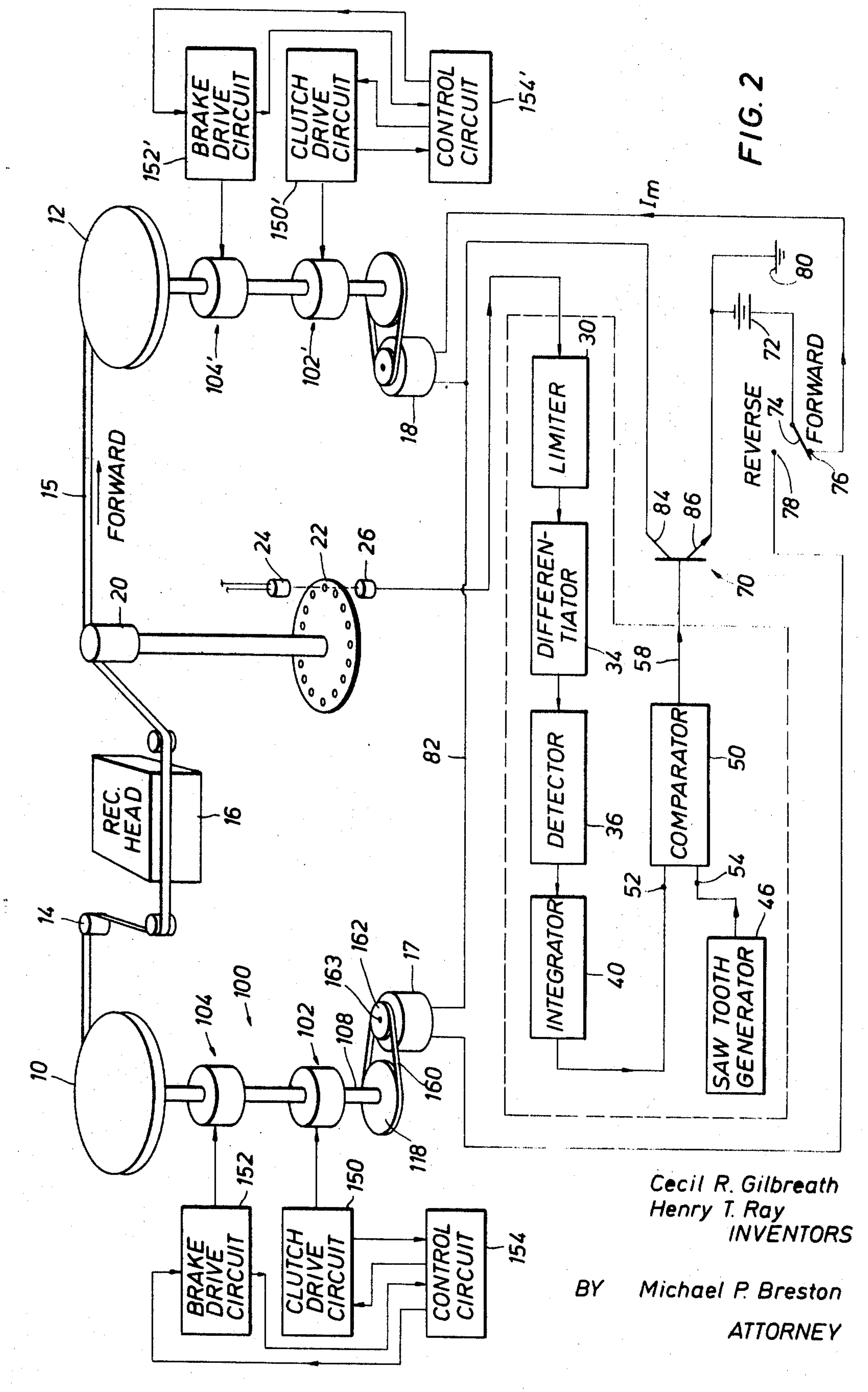
FIG. 2 is a block diagram representation of the electromechanical system used to control the speed of the tape.
Figure 3:
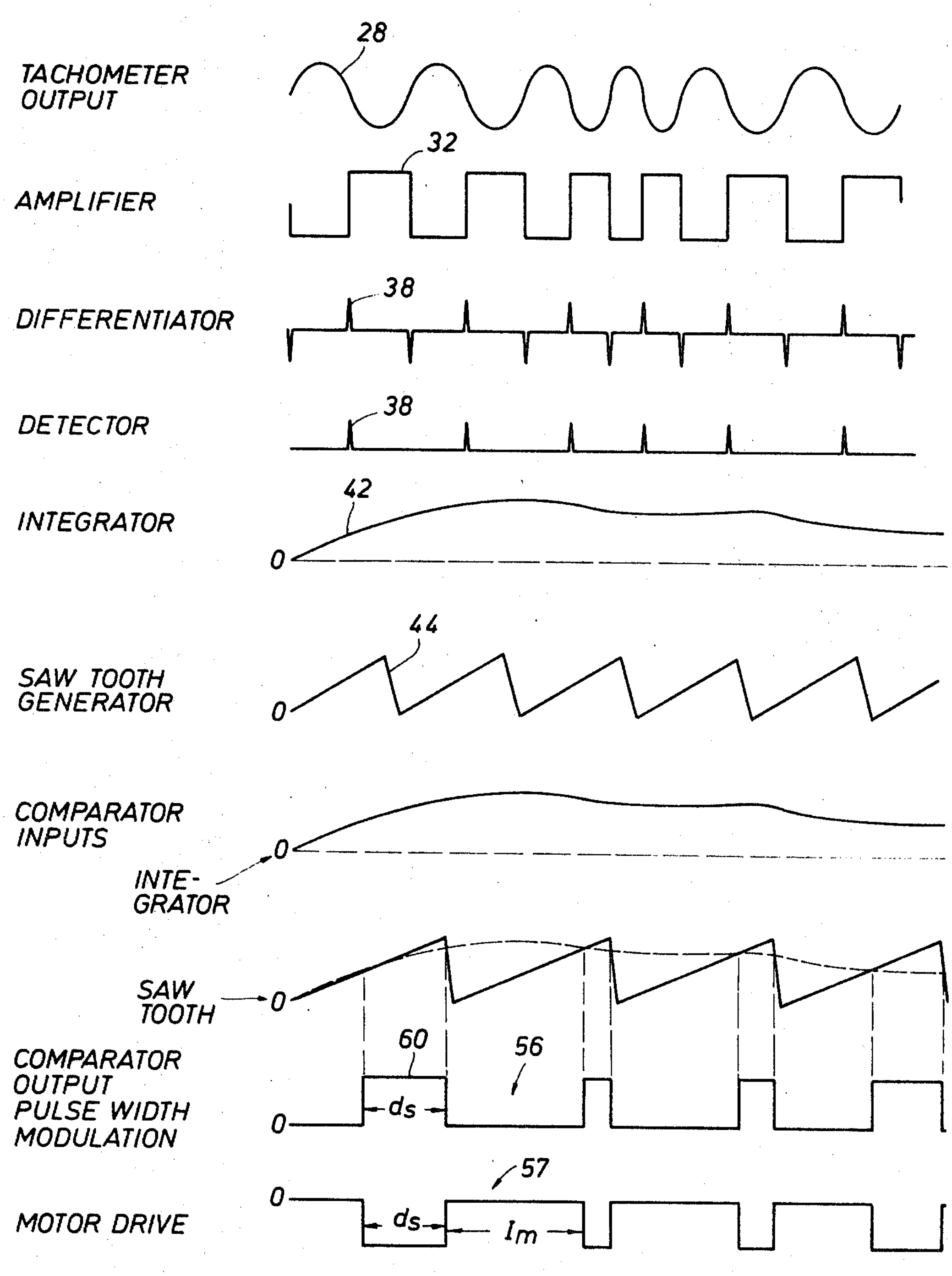
FIG. 3 shows a plurality of wave forms of signals appearing at the output terminals of certain networks shown in FIG. 2.

Referring now to the drawings and more particularly to FIGS. 1 through 3, the tape transport and speed control systems are mounted in a housing generally designated as 9 which includes a tape supply reel 10 and a tape take-up reel 12 both mounted in housing 9 in axial relationship. A plurality of guide rollers 14 allow a magnetic tape 15 from either reel 10 or 12 to move in a forward or reverse direction as shown by the arrow. The tape 15 passes in front of a conventional record/reproduce magnetic head 16. Although both reels 10 and 12 could be driven by a single electric motor it is preferred to use two motors. Motor 17 drives supply reel 10 and motor 18 drives take-up reel 12.

To sense the linear speed of tape 15 as it moves from one reel to the other, there is provided a conventional tachometer 20 having a photoelectric tone wheel 22. Wheel 22 in combination with a light source 24 and a photocell 26 produce an electric signal 28 which is an alternating AC wave the instantaneous frequency of which is directly proportional to the instantaneous linear speed of tape 15. This alternating signal 28 is to be compared with the amplitude of a standard signal the frequency of which is predetermined in accordance with the desired linear velocity of tape 15. The comparison with the standard signal is accomplished as follows: the AC signal 28 is first amplified and limited by an amplifier and limiter 30 to produce a square wave form 32. Wave form 32 is then differentiated by a differentiator 34 and detected by a detector 36 which allows only positive going spikes 38 to pass therethrough. These spikes 38 are integrated by an integrator 40 having an amplifier output stage to produce a slowly varying DC signal 42. The instantaneous level of DC signal 42 is periodically compared with the level of a sawtooth signal wave from 44 supplied by a sawtooth generator 46. The comparison is accomplished by a comparator 50 which receives at its one input 52 the integrated DC signal 42 and at its other input 54 the sawtooth wave form 44. The output comparator 50 is then a pulse wave 56 appearing on output line 58. The width of each pulse such as pulse 60, during each cycle of the sawtooth wave form 44 is indicative of the result of the comparison between signals 42 and 44. In other words, the amplitude of the integrated signal 42 is compared with the amplitude of the sawtooth signal 44 to provide a pulse wave form 56, the width ("duty cycle") $d_s$ of each pulse 60 being proportional to the linear speed of tape 15.

The output of comparator 50 on line 58 is applied to a motor-drive amplifier 70. When the pulse wave 56 is positive with respect to a reference level such as ground, amplifier 70 offers a relatively high-resistance path for the driving motor current $I_m$, which is a wave form 57 reversed with respect to ground. Hence current $I_m$ does not flow through the "in-circuit" driving motor 17 or 18 during the duration of each pulse 60. It follows that when the speed of tape 15 is exactly at its desired value, current $I_m$ will not flow to the in-circuit motor only during its pre-set duty cycle. If the speed of tape 15 is too slow compared to the desired speed, the duty cycle $d_s$ will decrease and current $I_m$ will flow for a correspondingly greater time interval, causing the motor to speed up. Conversely if the speed of tape 15 is too fast compared to the desired speed, the duty cycle $d_s$ will increase and correspondingly less current $I_m$ will flow through the motor causing it to slow down.

Motors 17 and 18 are energized from a DC source 72 the positive terminal of which is connected through a single-pole, double-throw switch 74 having contacts 76 and 78. Contact 76 allows motor 18 to become energized for forward displacement of tape 15 whereas contact 78 allows motor 17 to become energized for reverse displacement of tape 15. The negative terminal of source 72 is connected to ground 80. The return conductor 82 of both motors 17 and 18 is connected to the collector 84 of amplifier 70 while its emitter 86 is connected to the negative terminal of source 72 and ground 80. It will be appreciated that amplifier 70 serves the function of a switch to selectively connect and disconnect the return path 82 to and from the energy source 72, in dependence on the duration or length of the duty cycle $d_s$ of the current wave form 57 and hence on the speed of tape 15.

Figure 4:
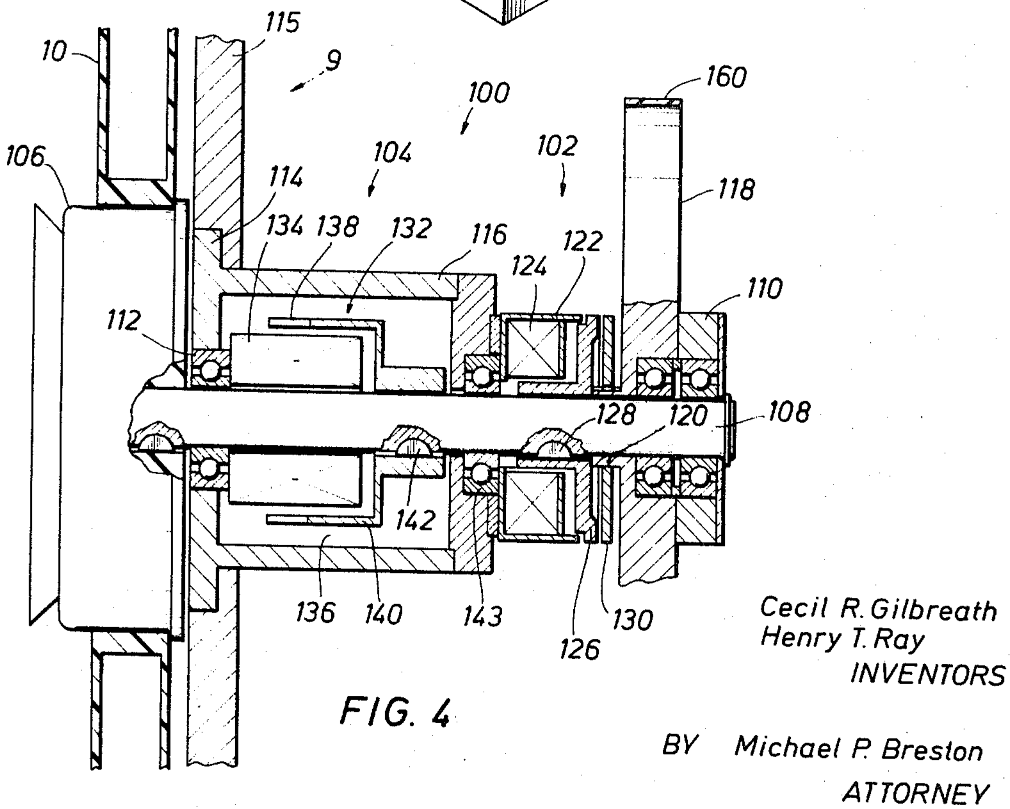
FIG. 4 is a view partly in cross-section of one of the driving mechanisms for driving the shafts on which the tape spools are mounted.

Referring now to FIGS. 2 and 4, the driving mechanism for each reel is substantially the same. Hence only the driving mechanism for reel 10 will be described in detail. Analogous parts in the driving mechanism for reel 12 are designated with the same numerals followed by a prime.

The driving mechanism for reel 10 is generally designated as 100 and includes an electromagnetic clutch unit 102 and a hysteresis brake unit 104. Reel 10 is mounted on a hub 106 which is keyed to a reel shaft 108. Shaft 108 is rotatably supported at one end by a bearing 110 and at its other end by a bearing 112 situated in top wall 114 of housing 116 of brake unit 104. Brake unit 104 is mounted on and supported by the upper deck 115 of housing 9. Rotatably mounted on shaft 108 is a pulley 118 which has an extended tubular shoulder 120.

Clutch unit 102 comprises a stator assembly 122 which includes a coil 124, a first rotor part 126 keyed to shaft 108 by key 128 and a second rotor part 130 which is slidably mounted in the wall of tubular shoulder 120. The second rotor part 130 rotates with pulley 118 but is allowed to become displaced relative to pulley 118 in a longitudinal direction.

The brake housing 116 comprises a stator assembly 132 which includes a coil 134 and a stator 136 made of a magnetic permeable material which defines an air gap 138. A thin-walled cup-shaped rotor 140, keyed by key 142 to shaft 108, rotates in the air gap 138 without frictional engagement with stator 136. A bearing 143 positioned between clutch unit 102 and brake unit 104 rotatably supports shaft 108 near its center.

The coil 124 of clutch unit 102 receives a driving current from a clutch drive circuit 150 while coil 134 of brake unit 104 receives a driving current from a brake drive circuit 152. The clutch and brake drive circuits 150, 152, respectively, receive command signals from a control circuit 154. Pulley 118 is driven by a belt 160 which is mounted on a pulley 162 supported by shaft 163 of motor 17.

In operation of the driving mechanism, rotation of pulley 162 on shaft 163 causes pulley 118 to rotate. The second rotor part 130 of clutch 102 rotates with pulley 118. With coil 124 de-energized there is no torque transmission between rotor parts 126, 130. Energization of the clutch drive circuit 150 by the control circuit 154 will cause the axially movable rotor part 130 to become attracted to and rotatable with the rotor part 126 thereby causing through keys 128 and 142 the rotation of shaft 108 and of the cup-shaped rotor 140 of brake unit 104, respectively. When coil 134 is energized by the brake drive circuit 152, rotor 140 becomes subjected to drag forces the intensity of which depends on the amplitude of the current flowing through coil 134.

The clutch and brake units 102, 104 have such desirable characteristics as precise controllability, smoothness of operation, effective torque transmission and effective frictionless braking of the reel shafts 108 and 108′.

In summary now of the operation of the tape speed controller of the present invention, the speed of tape 15 is translated by the tachometer tone wheel combination into an alternating current signal 28 which is limited, differentiated, detected, and integrated prior to becoming compared with a reference sawtooth signal by the comparator network 50. The output of comparator 50 is a pulsewidth modulated wave 56, the width or duty cycle of each pulse 60 being related to the speed of tape 15. Each pulse 60 controls the duration of the opening of transistor switch 70 in the return conductor 82 of the motors' energizing circuit comprising energy source 72 and switch 74.

Depending on the position of switch 74, either motor 17 or 18 becomes energized during the duration of each pulse $I_m$ in motor current wave 57. Each motor drives a reel shaft supporting a clutch-brake combination. Each reel shaft can experience a drag provided by the hysteresis brake unit, the intensity of the drag being determined by the amplitude of the current applied to the coil of the brake unit. The clutch and brake units are controlled by a control circuit.

When it is desired to advance tape 15 in the forward direction switch 74 is made to engage contract 76 thereby energizing motor 18 by the energization circuit which includes DC source 72. Switch 70 becomes closed thereby allowing motor current $I_m$ to flow through the collector-emitter circuit 84, 86. Control circuit 154′ will then cause clutch drive circuit 150′ to energize clutch unit 102′ and hence the rotation of pickup reel 12. Control circuit 154 through the brake drive circuit 152 will cause the brake unit 104 to exert a sufficient drag on reel shaft 108 to provide the necessary tension in tape 15. Each pulse 60 in wave form 56 will turn the transistor switch 70 off thereby preventing motor current $I_m$ from flowing through motor 18 during the duration or duty cycle of pulse 60.

Thus when switch 74 engages terminal 76 tape 15 starts moving in the forward direction, clutch drive circuit 150′ is energized, brake drive circuit 152 is energized, motor 17 is de-energized and the speed of tape 15 is immediately sensed by tachometer wheel 20 which produces a control signal wave form 28 for application to the energization circuit of motor 18 thereby controlling the duty cycle of the motor current pulses $I_m$ flowing through motor 18. To stop the displacement of tape 15, brake drive circuits 152 and 152′ become energized bringing shafts 108 and 108′ to a complete stop. To advance tape 15 in the reverse direction switch 74 is made to engage contact 78 and the remaining operation is in all respects similar to the one previously described with the functions reversed.

While this invention has been described in connection with a specific embodiment, it will be understood by those skilled in the art that variations may be made and all such variations are intended to be covered by the claims attached hereto.

What we claim is:

1. A reel-type magnetic tape recorder for recording and/or playing back signals on magnetic recording tape, comprising:
- a first reel shaft for engaging a tape supply reel;
- a second reel shaft for engaging a tape pickup reel;
- at least one electric motor having a motor shaft which rotates in response to current applied to said motor;
- a motor energization circuit having therein a control signal responsive element, said circuit being adapted to controllably energize said electric motor;
- coupling means for selectively imparting the rotation of said motor shaft to one of said reel shafts;
- a tape speed transducer system including means to sense the speed of said tape and to generate an alternating current wave having a frequency which is related to the speed of said tape;
- converting means for converting said alternating current wave into a first signal;
- means supplying a second signal, said second signal having a sawtooth wave form;
- a comparator adapted to receive said first and second signals and to provide a control signal resulting from the comparison of said first and second signals; and
- means applying said control signal to said element for controlling the duration of the current provided by said energization circuit to said motor.

2. The magnetic tape recorder of claim 1 and further including:
- another electric motor having a motor shaft which rotates in response to current applied thereto,
- said motor energization circuit being adapted to energize said another electric motor, and
- another coupling means for selectively imparting the rotation of said another motor's shaft to the other reel shaft.

3. The reel-type magnetic tape recorder of claim 1 wherein said coupling means include:
- clutch means for selectively imparting the rotation of said motor shaft to said reel shaft, and
- drag means coupled to said reel shaft for controllably exerting a drag torque on said reel shaft.

4. The reel-type magnetic tape recorder of claim 2 wherein said another coupling means include:
- another clutch means for selectively imparting the rotation of said another motor shaft to said other reel shaft, and
- another drag means for exerting a drag torque on said other reel shaft.

5. The reel-type magnetic tape recorder of claim 1 wherein said converting means include:
- a limiter to convert said alternating current wave into a square wave;
- a differentiator to differentiate said square wave and to provide a train of pulses of one polarity; and
- an integrator to integrate said pulses and to provide said first signal, said first signal being a variable direct-current signal.

6. The tape recorder of claim 5 wherein
- said control signal is a pulsewidth modulated wave having a duty cycle in dependence on the speed of said tape.

7. The magnetic tape recorder of claim 6 wherein said control signal responsive element is a semiconductor switch.

8. The tape recorder of claim 4 wherein:
- each motor is a direct-current operated motor,
- each clutch means is an electromagnetic clutch, and
- each drag means is an hysteresis-type brake.

References Cited

UNITED STATES PATENTS

| | | | |
|---|---|---|---|
| 2,469,706 | 5/1949 | Winther | 242—75.51 |
| 2,777,964 | 1/1957 | DiMino | 242—75.51X |
| 2,781,984 | 2/1957 | Buslik et al. | 242—75.51 |
| 3,114,850 | 12/1963 | Hansen | 242—75.51X |
| 3,297,266 | 1/1967 | Rumple | 242—186 |
| 3,488,696 | 1/1970 | Klang | 242—190 |

GEORGE F. MAUTZ, Primary Examiner

U.S. Cl. X.R.

242—75.51. 203. 204